UNITED STATES PATENT OFFICE.

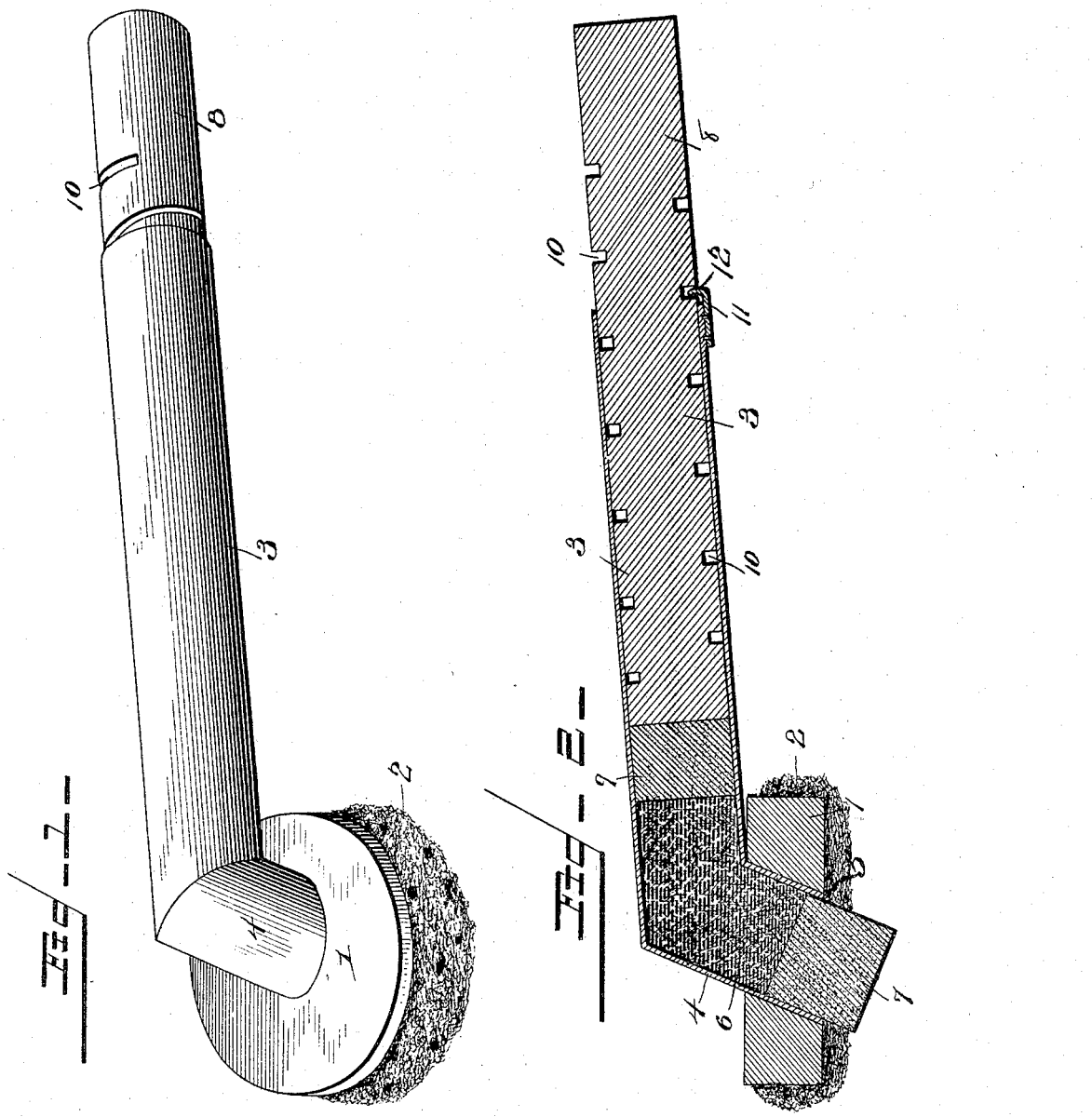

THOMAS E. ARNOLD, OF FLORENCE, OHIO, ASSIGNOR OF ONE-HALF TO C. B. TOZIER, OF CLEVELAND, OHIO.

BRUSH.

SPECIFICATION forming part of Letters Patent No. 607,908, dated July 26, 1898.

Application filed July 31, 1897. Serial No. 646,670. (No model.)

*To all whom it may concern:*

Be it known that I, THOMAS E. ARNOLD, a citizen of the United States, residing at Florence, in the county of Erie and State of Ohio, have invented a new and useful Brush, of which the following is a specification.

This invention relates to brushes, and especially to that class known as "daubers," designed to be used for applying blacking to stoves; and the object of the invention is to provide a dauber having a hollow shank to serve as a reservoir for the paste and a follower working in the shank to force the paste to the dauber.

With this object in view the invention consists of the several details of construction and combination of parts, as will be hereinafter fully described, and particularly pointed out in the claims.

In the drawings, Figure 1 is a perspective view of a dauber made in accordance with my invention. Fig. 2 is a longitudinal section.

Similar reference-numerals indicate similar parts in both figures.

1 indicates the head, to which the dauber 2 is secured in any suitable manner. The dauber may be of sheepskin, felt, sponge, or any other suitable material adapted to spread the paste upon the stove or other article.

3 indicates a tubular shank, preferably made of tin or other suitable sheet metal and provided near its front end with an elbow 4. The portion of the shank beyond the elbow extends at an obtuse angle to the main portion of the shank and is fitted in the head 1 in such manner that the open end 5 of the hollow shank is in the middle of the head. This shank will form a reservoir for the paste 6, and the dauber will be secured to the head around the open end of the reservoir, and preferably a stopper 7 will be removably inserted in the open end 5 to prevent the paste from drying.

8 indicates the follower, which is preferably of wood and provided at its front end with a cork 9, secured to it in any suitable manner and adapted to fit snugly in the shank and act as a piston to force the paste out of the reservoir. Instead of a cork any other suitable material may be secured to the inner end of the follower to form a piston. The follower 8 is provided with a spiral groove 10 on its periphery, and a pin 11 is secured to the rear end of the shank 3 and provided with a lug or lip 12, which projects into the spiral groove 10.

The requisite amount of paste will be put in the reservoir, and the follower 8 will then be inserted in the outer end of the shank with the lip 12 of the pin 11 projecting into the groove 10. It is obvious that by turning the follower axially in the right direction it will be caused to move inwardly in the shank 3, and the piston 9 will force the paste toward the open end 5 of the reservoir, and the dauber will spread it upon the stove or other article. When not in use, the open end 5 of the shank can be closed by means of the stopper 7, and the paste will not dry as readily as if exposed to the action of the atmosphere.

While I have described my invention as applied to a stove-dauber, it is evident that the reservoir and follower could be attached to a brush-head for a different purpose, and hence I do not intend to limit my invention to any special form of brush.

It will be understood that changes in the form, proportion, and the minor details of construction may be resorted to without departing from the spirit or sacrificing any of the advantages of this invention.

Having thus described the invention, what I claim is—

The combination with a brush-head, of a tubular shank forming a reservoir and having its forward end portion bent at an angle to the main body of the shank and secured to the head and opening out in the middle thereof, and a follower working in said shank and having a spiral groove in its periphery, and a lip projecting from the shank into said groove, substantially as described.

In testimony that I claim the foregoing as my own I have hereto affixed my signature in the presence of two witnesses.

THOMAS E. ARNOLD.

Witnesses:
  W. M. SIMPKINS,
  A. J. ARNOLD.